Patented Sept. 19, 1922.

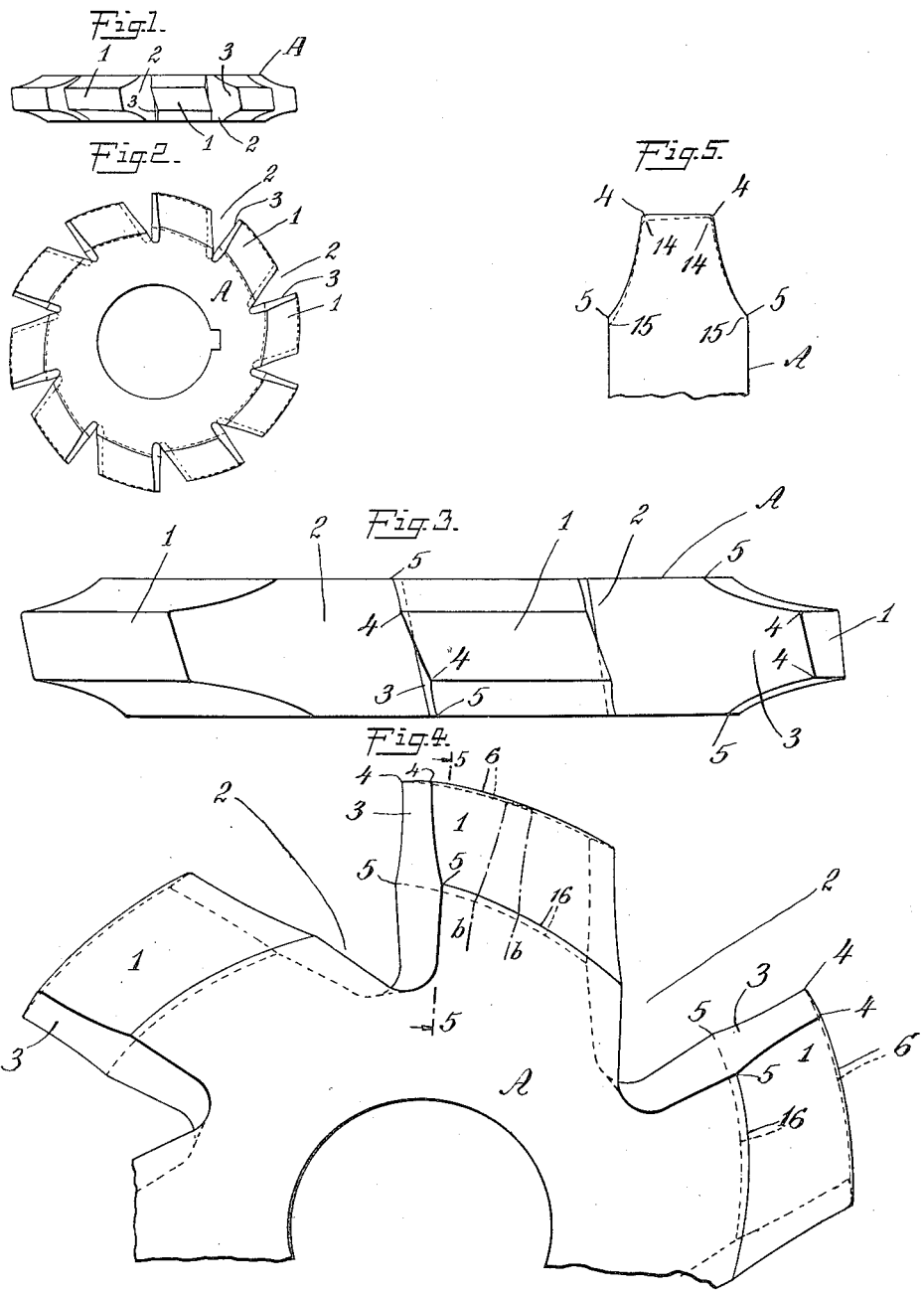

1,429,614

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

MILLING CUTTER FOR GEARS.

Application filed December 26, 1918, Serial No. 268,355. Renewed March 24, 1922. Serial No. 546,519.

*To all whom it may concern:*

Be it known that I, FRIEDERICH MÜLLER, a citizen of the United States, residing at Hartford, in the county of Hartford and State of Connecticut, have invented certain new and useful Improvements in Milling Cutters for Gears, of which the following is a specification.

The invention relates to milling cutters which are adapted to cut gear teeth, particularly spur gear teeth. A cutter embodying the invention falls within the scope of the claim in my patent for milling cutters No. 1,348,295, dated August 3rd, 1920, and it constitutes a special form of the cutter set forth in my copending application for milling cutters, Serial No. 368,928, filed March 26th, 1920. The present application constitutes in part a continuation of my application for milling cutters and methods of making, Serial No. 231,796, filed May 1st, 1918.

As pointed out in my said applications for milling cutters, it is advantageous to provide milling cutters with cutting edges which are inclined with respect to the cutter axis so as to enable each of the successve teeth to engage the work gradually and to effect a shearing cut. The object of the present invention is to provide a gear milling cutter which is adapted to accurately cut a predetermined contour corresponding exactly to the space between two gear teeth and which has its cutting edges longitudinally inclined with respect to the cutter axis for the purpose set forth and which is properly relieved.

In the accompanying drawing I have shown a gear milling cutter embodying the invention, and it will be understood that the cutter can be varied as concerns the exact form of the gear contour, as concerns the number of teeth, and as concerns the degree of inclination of the cutting faces and the degree of relief of the teeth. The drawing is to be considered as being illustrative only and is not to be construed as defining or limiting the scope of the invention, the accompanying claim being relied upon for that purpose.

Of the drawing:

Figs. 1 and 2 are plan and end views respectively of a gear milling cutter embodying the invention.

Figs. 3 and 4 are diagrammatic plan and end views respectively, on an enlarged scale. In these views there is shown a smaller number of teeth and the inclination of the cutting faces and the relief are increased in order to bring out the principles of the invention more clearly.

Fig. 5 is a diagrammatic view illustrating certain features of the cutter shown in Figs. 3 and 4.

Referring particularly to Figs. 1 and 2 of the drawing, A represents a gear milling cutter embodying the invention. Such a cutter may be made for cutting teeth in accordance with any standard system. I have illustrated a cutter for cutting standard involute gear teeth, but it will be understood that there is no limitation of the invention on this account.

The cutter is provided with a plurality of generally longitudinal teeth 1 between which are grooves 2, the teeth and grooves being preferably spaced uniformly. The grooves 2 can be of any usual or preferred depth and shape, as required. The front wall 3 of each tooth constitutes a cutting face and this cutting face is radial, or approximately so, in order to provide a satisfactory cutting angle. In accordance with the invention, each cutting face 3 is inclined or positioned obliquely so that its longitudinal lines lie at an angle to the axis of the cutter. Preferably, as shown, the entire teeth 1 are oblique or inclined and not merely the front walls 3 thereof, and preferably each cutting face 3 conforms to a helicoid. As illustrated in Figs. 1 and 2, the helicoid is one formed by a generatrix following the axis of the cutter and also following a helix on a cylinder concentric with the axis. The teeth and the cutting faces may be inclined in either direction and the degree of inclination may be varied as required.

Figs. 3 and 4 show the cutter diagrammatically, on an enlarged scale. As shown most clearly in these figures each cutting face 3 has a contour which is shaped to cut the predetermined tooth space contour when the cutter is rotated, this outline of the cutting face following the helicoidal surface thereof. All points along the top line 4—4 are at equal distance from the axis as are also the two inner terminal points 5, 5 of the side curves. Similarly all companion intermediate points are at equal distances from the axis so that when the cutter is rotated they will define the correct tooth space contour, as shown by full lines in Fig. 5. This relationship of the several points along the outline of the cutting face obtains notwithstanding the fact that the cutting face is a warped or helicoidal surface.

The cutter is relieved along lines 6 extending backward and inward from the cutting edges this relief being properly constructed notwithstanding the variations in radius at different points along the contour and notwithstanding the variations in angular position resulting from the warped cutting face. The relief lines 6 are maintained in similar relationship to each other as they extend backward and inward, the relief lines preferably conforming to spirals of Archimedes. The result is that each tooth of the cutter, at any axial plane of intersection such as 5—5, has a distorted shape, as shown by dotted lines in Fig. 5. This distorted shape includes points 15, 14, 14 and 15 corresponding respectively to the points 5, 4, 4 and 5 on the outline of the cutting face. The distortion of shape results from the fact that the successive inward inclined relief lines 6 start at different angular positions because of the inclined or helical cutting face. Therefore, with the cutter first inclined in the direction illustrated, the several points 14, 14 and 15 to the left of the point 5 or 15 are spaced inward from the respective points 4, 4 and 5 by progressively increasing distances. Notwithstanding this distortion in shape at an axial plane of intersection, the outline or effective contour at the cutting face is correct, as before stated.

The effective contour at the cutting face is correct, as stated, and this correct effective contour is maintained when the cutting faces are ground backward. In order for this to be true, it is obviously necessary for the cutter teeth to present the same shape at successive surfaces of intersection, the said surfaces being similar in form and position to the initial cutting faces. At any surface back of the face 3 and similar to the said face the same contour will be found, as illustrated by the dot-and-dash line $b$—$b$.

A cutter embodying the invention may be made in accordance with the method set forth in my patent for methods of making milling cutters, No. 1,348,298, dated August 3rd, 1920, or in accordance with the method set forth in my copending application for methods of making milling cutters, Serial No. 326,875, filed September 27th, 1919. If preferred other methods may be used.

What I claim is:

A milling cutter for cutting a predetermined contour conforming exactly to the space between two adjacent gear teeth, provided with a plurality of teeth, each having a helicoidal front cutting face with a contour adapted to cut the said predetermined contour and having the outer surface behind the cutting face relieved along lines extending backward and inward from the edge to permit grinding on the cutting face without changing the said contour.

In testimony whereof, I hereto affix my signature.

FRIEDERICH MÜLLER.